United States Patent [19]
Barish

[11] 3,844,564
[45] Oct. 29, 1974

[54] EDUCATIONAL GAME RELATING TO COMPUTERS

[76] Inventor: Benjamin J. Barish, 36 Yehuda Hanasse St., Tel Aviv, Israel

[22] Filed: May 21, 1973

[21] Appl. No.: 361,855

[30] Foreign Application Priority Data
May 22, 1972   Israel .............................. 39494

[52] U.S. Cl. ...... 273/134 A, 273/134 C, 273/134 D, 273/136 A
[51] Int. Cl. ............................................ A63f 3/04
[58] Field of Search ..................... 273/134, 136 A

[56] References Cited
UNITED STATES PATENTS

| | | | |
|---|---|---|---|
| 1,136,106 | 4/1915 | Corning | 273/134 GP |
| 1,527,219 | 2/1925 | Potter | 273/134 AD |
| 2,977,713 | 4/1961 | Alelyunas | 273/134 C |

FOREIGN PATENTS OR APPLICATIONS

1,394,390   2/1965   France

*Primary Examiner*—Anton O. Oechsle

[57] ABSTRACT

An educational game relating to computers comprises a data-chip and a control-chip for each player, representing data and control signals respectively. The game further includes a board marked with a path of movement for the data-chips, which path includes AND-gates, OR-gates, INHIBIT-gates, and a number of other digital devices such as delays, diodes, inverters, counter, memory drum, and the like. The game further includes binary dice serving as a random number generator which are thrown by each player in his turn to determine the number of steps he may move his data-chip or control-chip. The control-chip may be used offensively, to open gates for him; or defensively, to close gates against his opponent. As each player advances his data-chip, he encounters the various digital devices in its path of movement, which devices influence the advance in accordance with their normal functions in a computer. In an electrical version of the game, an indicator lamp is provided for each of the gates. The data-chips and control-chips are provided with metal bases which, when positioned at the gates, bridge interruptions in the lamp circuits to energize the lamps under appropriate circumstances to indicate that the gates are open.

9 Claims, 7 Drawing Figures

EDUCATIONAL GAME RELATING TO COMPUTERS

BACKGROUND OF THE INVENTION

The present invention relates to games, and particularly to educational games which are entertaining to play but which also aid the players in learning about the structure and operation of digital devices such as are used in computers and other data processing systems.

SUMMARY OF THE INVENTION

According to the invention, there is provided a game comprising a set of playing pieces each designating a data signal, there being one playing piece for each player; a board marked with a path of movement divided into a plurality of steps for the data signal playing pieces, the board carrying indicia designating a number of digital devices or elements at different locations in the path of movement; and random number generator means (e.g., dice), manipulatable by the players to determine the number of steps to be taken by each player in his turn.

According to another feature of the invention, the board includes indicia designating logical gates each having two inputs and one output. One input and the output are in the path of movement of the data signal playing piece, referred to below as the "data-chip." The game includes a further playing piece for each player designating a control signal, this playing being of distinguishing physical characteristics from the data-chip and referred to below as the "control-chip." The board indicia also includes a control signal path of movement for each controlled gate, the second input of each controlled gate being in the path of movement of the control-chip for the respective gate.

According to the preferred embodiment of the invention described below, the random number generator manipulated by the players comprise a plurality of dice which carry indicia designating the numbers in the binary notation. In the described embodiment, there are three dice, the indicia thereof designating in the binary notation the decimal numbers 0 to 7.

In playing the game, each player first places his data-chip on the data input terminal and advances it through the path of movement and digital devices designated by the indicia carried by the board. Each player advances his data-chip the number of steps according to the number displayed by the dice thrown by him in his turn. He can also use part or all of the number of the dice for moving his control-chip offensively, to open gates in his path of movement, or defensively, to close gates in the path of movement of his opponent(s). The first player that succeeds in advancing his data-chip to the output terminal is designated the winner.

As the player advances his data-chip, he encounters the various digital elements in its path of movement. These elements influence the advance in accordance with their normal functions in a computer or other data processor. In this manner the players learn the functions of these digital elements. The game would preferably include accompanying material which illustrates each of these elements and also describes their functions and modes of operation in a computer or other data processing system. Since binary notation is preferably used for the dice, the players also learn the binary notation and the respective values in the decimal notation.

BRIEF DESCRIPTION OF THE DRAWINGS

While the invention may be embodied in a wide variety of forms, for purposes of example one preferred form is illustrated in the drawings, wherein.

DESCRIPTION OF THE PREFERRED EMBODIMENT

Figure 1A:
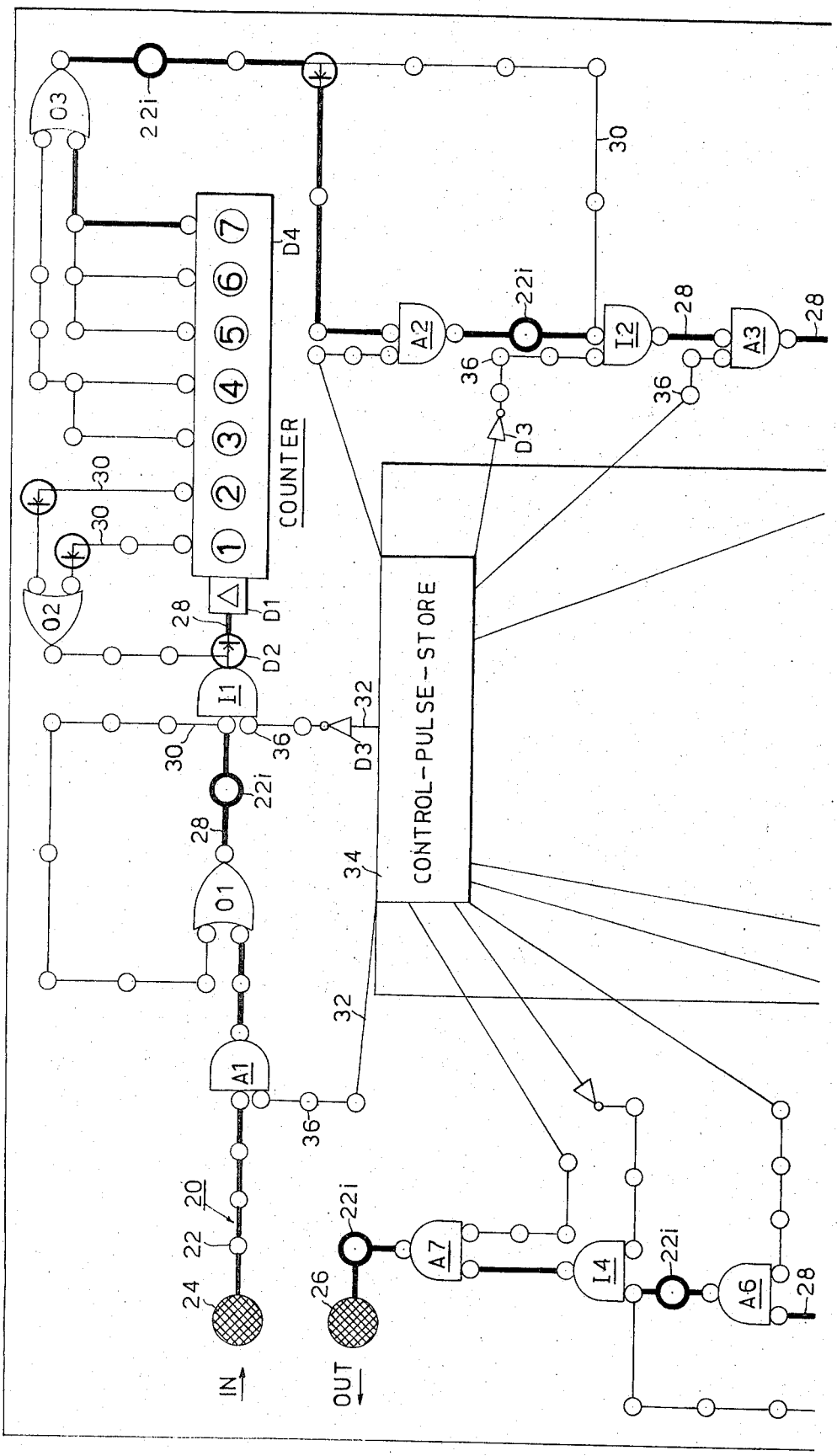
FIGS. 1a and 1b illustrate the board and the indicia carried thereby.

Following is a general description of the contents of the game described herein as the preferred embodiment of the invention, as well as a set of general rules and more specific rules that may be used in playing the game described.

Contents of the Game

Figure 2:
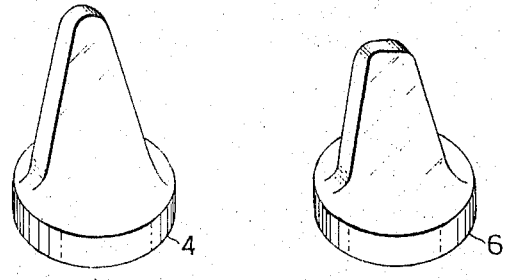
FIG. 2 illustrates one of the data-chips and one of the control-chips used in the described game.

Following are the main elements of the game illustrated in the drawings:

1. A plurality of data-chips 4 (FIG. 2), one for each player. These represent the data signals and are of different colors so that each player can identify his data-chip.

2. A plurality of control-chips 6 (FIG. 2), one for each player. These represent the control signals, and are also of different colors for the different players. Preferably, they are smaller, and of slightly different shape, than the data-chips 4.

Figure 3:
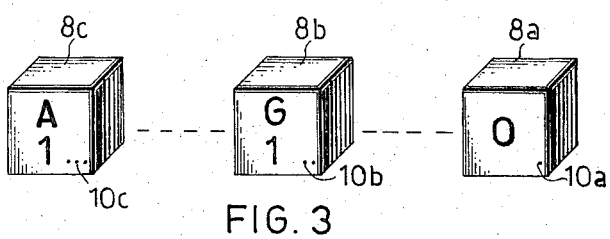
FIG. 3 illustrates the dice used in the game.
Figure 4:
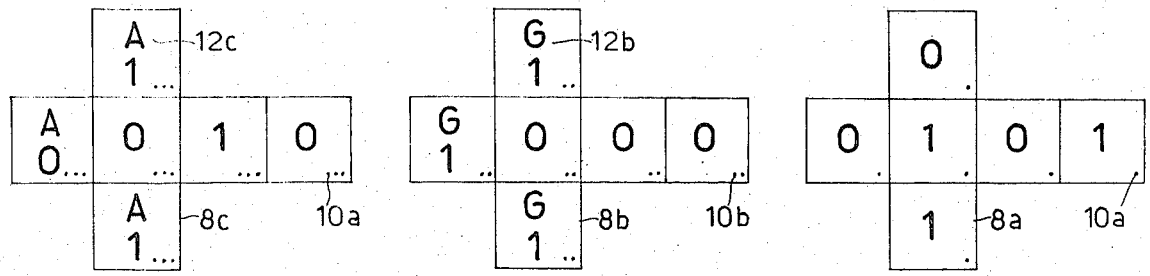
FIG. 4 illustrates the indicia carried on their respective faces.

3. Three dice 8a, 8b, 8c (FIGS. 3 and 4) specially marked on each face with 0 or 1 according to the binary notation. In addition, each face carries one, two or three dots 10a, 10b, 10c, in the lower right-hand corner to designate the respective order of the die. Further, the highest order die 8c carries an A 12c on three faces, the middle order die 8b carries a G 12b on three faces, and the lowest order die 8a carries on 0 on three faces. The arrangement is such that there are one-in-eight chances that the three thrown dice will display "AGO." When this occurs, this stands for "All Gates Open," and the player is thereby automatically entitled to pass through any gate in his path at that time, as described below.

Figure 1B:
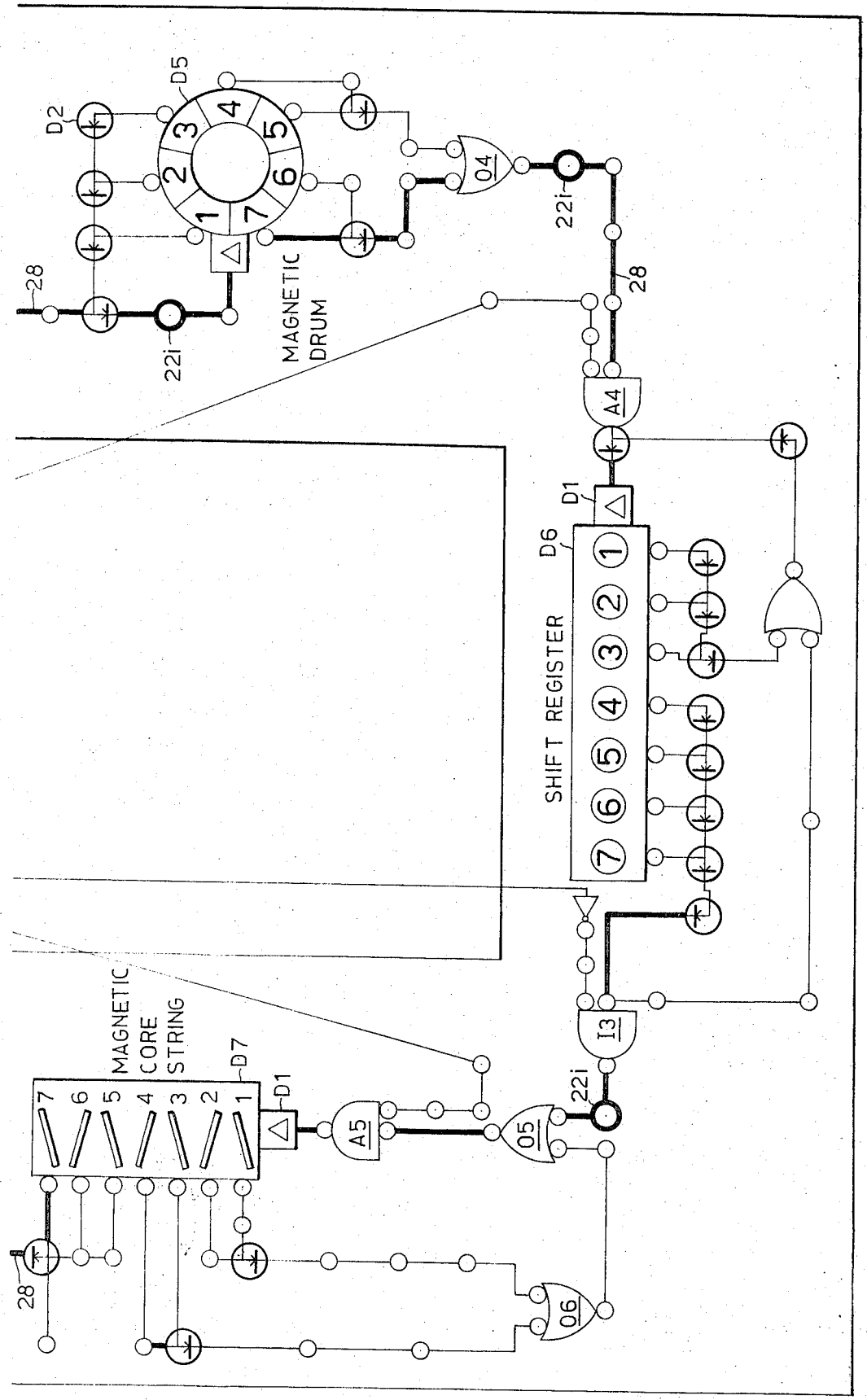

4. A playing board (FIG. 1) carrying the following markings or indicia:

a. a plurality of logical elements designating AND-gates (A1, A2 —), OR-gates (O1, O2 —) and INHIBIT-gates (I1, I2 —); and a plurality of digital devices including delay devices D1, diodes D2, inverters D3, a counter D4, a memory drum D5, a shift register D6, and a magnetic core string D7.

b. a data path 20 connecting together the logical elements and the digital devices and defining the path of movement of the data-chips 4. This path of movement is divided into a plurality of steps 22 starting from the "In" terminal 24 and ending with the "Out" terminal 26. This data path includes a main path 28, preferably in heavy black lines, and several branch paths 30, preferably in lighter black lines. Some steps 22i are designated "Instruction Read-out" spots, and may be slightly larger or otherwise distinguished from the others.

c. control paths 32 along which the control-chips 6 may move from a control-pulse store 34 to the AND-gates and INHIBIT-gates for controlling their opening and closing, as described below. Each control path 32 is also divided into a plurality of steps 36, preferably of a smaller circle than the data steps 22, from the store 34 to the respective gate. The control paths 32 to the AND-gates A1, A2, —, are gate-opening paths, and therefore they, as well as their circular steps 36, may be colored green; whereas the control paths 32 to the INHIBIT-gates I1, I2 —, are gate-closing paths and may therefore be colored red.

Figure 5:
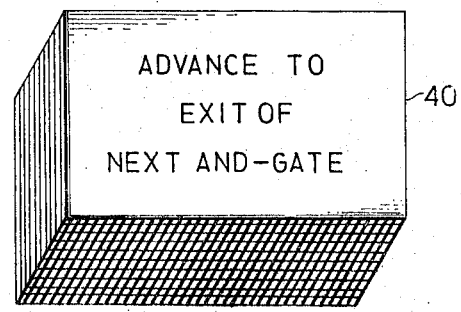
FIG. 5 illustrates a stack of instruction cards that may be used.

5. A stack of instruction cards 40 (FIG. 5) each carrying an instruction. For example there may be about 25 instruction cards 40, most marked with beneficial instructions such as "advance to exit of next AND-gate," but some marked with undesirable or penalizing instructions such as "return to input of preceding gate."

General Rules

1. Each player receives one data-chip 4 and one control-chip 6 both of the same color. During the game, he moves his data-chip along the data path 20 on the playing board (FIG. 1) according to the throw of the dice in his turn. He uses his control-chip 6 both offensively to advance his data-chip by opening AND-gates (A1, A2—), and defensively, to block the advance of his opponent's data-chip by closing INHIBIT-gates (I1, I2—), as described below.

2. Each player in his turn throws the three binary dice (FIGS. 3 and 4) and advances his data-chip 4 the number of moves corresponding to the number displayed on the dice. The numbers are displayed in the binary notation, and the player moves his data-chip the corresponding number in the decimal notation. In addition, whenever the player throws "AGO," all gates are open. This entitles the player to move his data-chip the number of moves displayed and to pass through any gate in his path during that move.

3. In the advance of the data-chips 4, the gates and other digital devices which are encountered are overcome only in accordance with the Specific Rules set forth below.

4. Aftr throwing the dice, the player can elect to advance first his control-chip 6 to reach the control input of a gate; if any excess remains he can elect to advance his data-chip 4 that excess.

5. Except for a Delay D1, a later-moved data-chip 4 cannot occupy the same spot as an earlier-moved one and therefore must stop at the first preceding unoccupied spot.

6. If a data-chip 4 lands on an Instruction spot 22i, the player removes the top Instruction Card 40 from the stack and executes the instruction specified therein.

7. The game ends when one player reaches "OUT" terminal 26, that player being declared the winner.

Specific Rules

As the data-chips 4 are advanced along the data path 20 on the playing board, they encounter the following gates and other digital devices (listed in the order encountered):

1. AND-gate A1, A2—This THis is a device that has a plurality (two in the board of FIG. 1) of input terminals and one output terminal, and produces an output when all inputs are present.

When encountering an AND-gate, the data-chip can pass through if:

a. the player has thrown "AGO"; or b. the input terminal is already occupied by a data-chip of an opponent.

In the absence of either, the data-chip cannot pass through the AND-gate (it being closed) but must remain at the data input terminal until the player's next turn, at which time he may try to open the gate by throwing the dice and moving his control-chip 6 to the gating terminal of the AND-gate, this being the last step 36 from control-pulse store 34 along the control path 32 to the AND-gate.

In the latter option, the gate is only opened when and if the numbers are sufficient for the control-chip to reach the gating terminal; if not sufficient, the control-chip is left at the position advanced until the player's next turn, when he can advance it further by the dice number in that turn. When the player does succeed in advancing his control-chip 6 to the gating terminal, he thus opens the gate, and he can use any excess moves to advance his data-chip through the gate. As soon as the data-chip has passed through the gate, his control-chip 6 is returned to store 34, thereby reclosing the gate.

2. OR-gate O1, O2———, This is a device that has a plurality (two in the board of FIG. 1) of input terminals and one output terminal, and produces an output when any input is present.

When encountering an OR-gate, from either input terminal, the data-chip may freely pass through it.

3. INHIBIT-gate I1, I2 —, This is a device that has a data input terminal and a blocking terminal, and always produces an output except when a blocking ("Not") pulse appears at the blocking terminal.

When encountering an INHIBIT-gate, the data-chip 4 can always pass through it, unless another player in his preceding turn has succeeded to place a blocking ("Not") pulse at the blocking terminal, the last step 36 to that gate in the control pulse path 32. If a prior player has so succeeded, the data-chip 4 cannot pass through the INHIBIT-gate, but rather is detoured to the indicated branch path 30.

The INHIBIT-gate enables the players to attempt to block the advance of an opponent's data-chip 4 and to detour it to a branch path 30. To do so the player moves his control-chip 6 the number of steps of the dice thrown, and if it is insufficient to bring his control-chip to the blocking terminal of the INHIBIT-gate, the player may (optional) continue during his next turn; but once he succeeds in placing his control-chip at the blocking terminal, he can leave it there only until his next turn, at the beginning of which he must return it to the control pulse store 34.

4. Delay D1. This is a device that delays the signal. When encountering a Delay, the data-chip 4 is delayed (remains at the spot) until the player's next turn so that it is always at that spot at the beginning of the next turn.

5. Diode D2. This is a device that permits the signal to pass through only in one direction. When encountering a Diode, the data-chip can pass through it only in the direction indicated by the arrow of the diode.

6. Inverter D3. This is a device that inverts the signal. The only time an Inverter is encountered in the illustrated playing board is in the path of the control-chip to the blocking terminal of the INHIBIT-gates. The inverter inverts the control signal to a "not" signal to close the INHIBIT-gate.

7. Counter D4. This is a device that counts input pulses. When encountering a Counter, the data-chip is advanced to the output line corresponding to the number displayed by the dice thrown; and at the player's next turn, it leaves the counter through that output line.

8. Memory Drum D5. This is a device including a rotating cylindrical drum which stores a signal in a specified memory cell. When encountering a Memory Drum, the data-chp is advanced to the number of the memory cell corresponding to the number displayed by the dice thrown; and during the player's next turn, the data-chip leaves the memory drum through that output line.

9. Shift Register D6. This is a device which shifts the signal to a specific location in a register. In this case, also, the data-chip is advanced to the location corresponding to the number on the dice thrown, and during the player's next turn, the data-chip leaves the device through the output line of that location.

10. Magnetic Core String D7. This is a device which includes a string of magnetic cores and stores the signal in a specific location therein. In this case also, the data-chip is advanced to the location corresponding to the number on the dice thrown, and during the player's next turn, the data-chip leaves the device through the output line of that location.

The foregoing is but one possible form. Depending upon the age of the intended players, the complexity could be decreased or increased, e.g., by including other devices acting as gates (gated pulse amplifiers, comparators, etc.), other digital devices (magnetic core arrays, etc.), and other gates (NAND, NOR, etc., including appropriate inverters). Further, the game could include a plurality of punch-cards (simulating real ones) which each player receives from the board or returns to the board when his data-chip 4 lands on a spot 22 marked "read-out" or "read-in," the winner of the game being determined by the one who has most such cards when the first one reaches the "Out" terminal 26.

Electrical Versions

Figure 6:
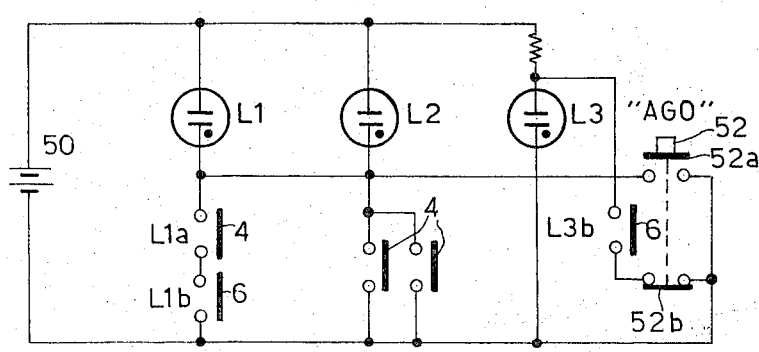
FIG. 6 illustrates an electrical circuit that may be used to incorporate electrical indicators into the board.

A more sophisticated electric version may be made, wherein each gate includes a light indicator (e.g., a green lamp) which is energized when the gate is open. A circuit that could be used is schematically shown in FIG. 6.

An indicator lamp is provided for each of the gates, these lamps being represented in the circuit diagram by lamp L1 for each AND-gate; lamp L2 for each OR-gate, and lamp L3 for each INHIBIT-gate. Each indicator lamp is connected in a separate parallel branch across the power supply, e.g., battery 50. Both the data-chips 4 and the control-chips 6 include metal bases adapted, when positioned at the input terminals to the gates, to bridge interruptions in the circuits of the respective indicator lamp.

Thus, the two input terminals to the AND-gate lamp L1 include interruptions L1a, L1b, which are bridged respectively by chips 4, 6 to energize that lamp. In the OR-gate lamp L2, the two interruptions are shown in parallel, each being bridged by a data-chip 4. INHIBIT-gate lamp L3 is always energized, but includes interruptions L3b shunting the lamp, to extinguish same when bridged by a control-chip 6.

In addition, an "AGO" button 52 is provided which is manually depressed when "AGO" appears. This actuates two sets of contacts: contacts 52a close to override the interruptions on lamps L1 and L2; and contacts 52b open to over-ride the shunt of lamp L3. Thus all lamps are energized.

If desired, the circuit could include two lamps (red and green) for each gate, with the appropriate electrical connections to energize the red lamp if the gate is closed when the data-chip 4 is applied to the input terminal, or to energize the green lamp if the gate is then open.

What is claimed is:

1. A game simulating the operation of digital computers, comprising:
   a. a first set of playing pieces each designating a data signal, there being one such data-signal playing piece for each player;
   b. a second set of playing pieces each designating a control signal, there being one such control-signal playing piece for each player, said control-signal playing pieces being of distinguishing physical characteristics from said data-signal playing pieces;
   c. a board marked with a data-signal path of movement divided into a plurality of steps for said data-signal playing pieces, and with a plurality of control-signal paths of movement divided into a plurality of steps for said control-signal playing pieces, said board carrying indicia designating logical gates used in digital computers, each gate having two inputs and one output, one input and the output of each gate being in the path of movement of the data-signal playing pieces, and the second input of each gate being in a path of movement of the control-signal playing pieces;
   d. and random number generator means manipulatable by the players to determine the number of steps to be taken by each player in his turn in moving his respective data-signal playing piece and/or control-signal playing piece.

2. A game according to claim 1, wherein at least some of said gates designate logical AND-gates permitting the passing therethrough of the data signal playing pieces when the second input of said gate is occupied by a control signal playing piece.

3. A game according to claim 1, wherein at least one of said gates designates an OR-gate having two inputs and one output, one input and the output being in the main path of movement of the data signal playing pieces, the other input being in a branch path of movement of the data signal playing pieces joining same to the main path of movement.

4. A game according to claim 1, wherein at least one of said gates designates an INHIBIT-gate inhibiting the passing therthrough of a data signal playing piece when the second input thereof is occupied by a control signal playing piece.

5. A game according to claim 1, wherein said gates include indicators indicating when the gate is closed or open, the board including means operated by the respective data signal and control signal playing pieces for actuating said indicators.

6. A game according to claim 5, wherein said indicators are electric lamps, the board including an electric circuit, and the playing pieces including electrical conductors adapted to bridge portions of the electric circuit for actuating the indicator lamps.

7. A game according to claim 1, wherein said random number generator means comprises a plurality of elements carrying indicia designating numbers in the binary notation, said pluality of elements including further indicia designating, when displayed, that all said gates are open.

8. A game according to claim 1, wherein said board indicia also designates data processing elements each having one input for the data signal playing pieces and a plurality of outputs at least some of which direct the data signal playing pieces to different branches of said data signal path, according to the number displayed by the random number generator means.

9. A game according to claim 1, further including a stack of instruction cards each marked with an instruction to be performed by the player who receives same, certain of said stops on the board being designated as instruction stops requiring the player who lands on same to take the top instruction card in the stack and to perform the instruction marked thereon.

* * * * *